C. H. HOLLINGSHEAD.
Animal Trap.

No. 218,175.  Patented Aug. 5, 1879.

WITNESSES:
Francis McArdle
C. Sedgwick

INVENTOR:
C. H. Hollingshead
BY Munn & Co
ATTORNEYS.

UNITED STATES PATENT OFFICE.

CALEB H. HOLLINGSHEAD, OF WASHINGTON, NEW JERSEY.

IMPROVEMENT IN ANIMAL-TRAPS.

Specification forming part of Letters Patent No. 218,175, dated August 5, 1879; application filed December 10, 1878.

*To all whom it may concern:*

Be it known that I, CALEB H. HOLLINGSHEAD, of Washington, in the county of Warren and State of New Jersey, have invented a new and useful Improvement in Animal-Traps, of which the following is a specification.

Figure 1:
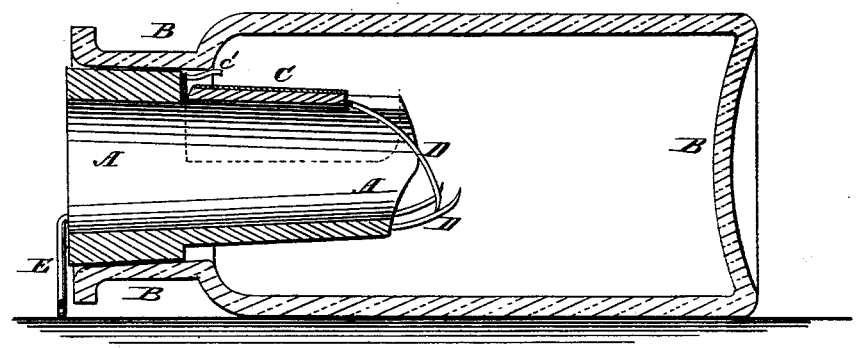
Figure 2:
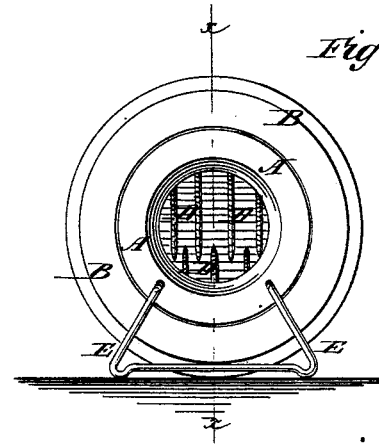
Figure 3:
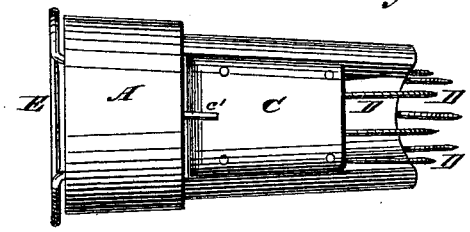

Figure 1 is a vertical longitudinal section of my improved trap, taken through the line $x$ $x$, Fig. 2. Fig. 2 is a front view of the same. Fig. 3 is a top view of the same, the glass jar being removed.

Similar letters of reference indicate corresponding parts.

The object of this invention is to furnish an improved trap for catching mice, rats, and other animals, which shall be simple in construction and convenient and reliable in use.

The invention consists in providing a jar or bottle of cylindrical form with a tube that fits the neck, has converging wires on the inner end, and carries a wire frame on the outside, bent to form a stop for the tube and prevent the jar from turning.

A is a slightly-tapering tube, made of wood or other suitable material, and of such a size as to fit into the neck of a fruit-jar or other glass jar, bottle, or vessel, B. The cavity of the tube A is made of such a size that the animal trapped for may readily pass through it.

The upper inner part, C, of the tube A is made separate, and is hinged at its end to the body of the said tube by rubber cloth, wire, or other suitable means.

To the inner end of the hinged part C of the tube A and to the inner end of the stationary part of the said tube A are attached sharp-pointed curved wire teeth D, the ends of which interlock with each other, as shown in Figs. 1, 2, and 3, so as to prevent the animal when he has raised the hinged gate C and passed through from raising the said gate and escaping.

The gate C may also be provided with flanges at its side edges to overlap the sides of the stationary part and prevent an opening from being formed at the sides of the tube when the said gate is raised.

A stop, $c'$, may be attached to the solid upper part of the tube A for the gate C, when raised, to strike against, to prevent the said gate from being raised too high.

To the lower side of the outer end of the tube A are attached the ends of a wire, E, which is bent into such a form as to rest upon the floor, ground, or other surface upon which the trap is placed to prevent the jar B from turning. Any suitable bait may be placed within the jar B.

In using the trap, the jar B is laid upon its side with the gate C upward, and is kept from turning by the feet E. When thus arranged, the animal in prowling about sees the bait, and in seeking to get it he enters the tube A, raises the gate C, passes through into the jar B, and is caught.

Other animals, seeing the bait and the animal or animals in the jar B, also pass in through the tube A and are caught.

The tubes A and their appliances are designed to be made and sold without the jars B, the buyers applying them to any suitable jars B that they may have; or the tubes and jars may be sold together, as the buyers may wish.

I am aware that it is not new in traps to use a tubular entrance with sharp points at the end that yield to the pressure of the animal in entering and prevent his exit; but

What I claim is—

The combination, with the tube A and cylindrical jars B, having neck in which said tube fits, of the wire E, radially bent to form a stop for the tube and also prevent the jar from turning, as specified.

CALEB HICHCOCK HOLLINGSHEAD.

Witnesses:
    A. GAYLORD,
    J. V. CARTER.